(12) United States Patent
Beaujot

(10) Patent No.: US 8,578,870 B2
(45) Date of Patent: Nov. 12, 2013

(54) SEEDING METHOD AVOIDING OVERLAP

(75) Inventor: Norbert Beaujot, Emerald Park (CA)

(73) Assignee: Straw Track Manufacturing Inc., Saskatchewan (CA)

( * ) Notice: Subject to any disclaimer, the term of this patent is extended or adjusted under 35 U.S.C. 154(b) by 91 days.

(21) Appl. No.: 13/138,138

(22) PCT Filed: Dec. 7, 2009

(86) PCT No.: PCT/CA2009/001867
§ 371 (c)(1),
(2), (4) Date: Nov. 2, 2011

(87) PCT Pub. No.: WO2010/078642
PCT Pub. Date: Jul. 15, 2010

(65) Prior Publication Data
US 2012/0037057 A1    Feb. 16, 2012

(30) Foreign Application Priority Data
Jan. 12, 2009 (CA) .................................... 2650340

(51) Int. Cl.
*A01C 7/08* (2006.01)
*A01C 5/06* (2006.01)
*A01C 7/20* (2006.01)

(52) U.S. Cl.
USPC ........................................ 111/200; 111/900

(58) Field of Classification Search
USPC ............ 111/200, 900, 903, 904, 14; 700/237, 700/240–244; 701/50; 239/63, 64, 398, 239/422, 578
See application file for complete search history.

(56) References Cited

FOREIGN PATENT DOCUMENTS

CA     2349682     2/2002

OTHER PUBLICATIONS

International Search Report for PCT/CA2009/001867, mailed Mar. 3, 2010.

*Primary Examiner* — Christopher J Novosad
(74) *Attorney, Agent, or Firm* — Nixon & Vanderhye P.C.

(57) ABSTRACT

A method for applying agricultural products on a field with an implement guided by an external guidance system, wherein the implement comprises a plurality of sections that can be turned on to apply the products or turned off to stop applying the products, includes mapping the field to determine an implement travel path; determining overlap areas in the field where a section of the implement on a later pass will travel over a portion of an earlier pass of the implement; moving the implement along the implement travel path with sections turned on as required to apply the products on the field outside the overlap areas; and for at least one overlap area, during the earlier pass turning sections of the implement that are completely in the overlap area off, and during the later pass turning sections of the implement that are in the overlap area on.

12 Claims, 2 Drawing Sheets

SEEDING METHOD AVOIDING OVERLAP

This application is the U.S. national phase of International Application No. PCT/CA2009/001867, filed 7 Dec. 2009, which designated the U.S. and claims priority to CA Application No. 2650340, filed 12 Jan. 2009, the entire contents of each of which are hereby incorporated by reference.

This invention is in the field of agricultural seeding methods and in particular a seeding method that avoids overlapping and double seeding.

BACKGROUND

The cost of overlapping of agricultural implements is well understood. When applying agricultural products such as seed, fertilizer, and chemicals the overlapped portions of the field receive twice as much of the products as is desired. The cost of the agricultural products thus wasted can be significant, and as well there are significant undesired effects of double seed and fertilizer application, such as the tendency of crop in overlapped areas to fall down or lodge.

As the width of field implements increases, overlaps become an increasing concern as well. For example where a narrow strip of ground perhaps 10 feet wide remains to be done at the end of a field operation, and where the machine being used is 60 feet wide, if no sectional controls are provided then to complete the field a strip 50 feet wide will be overlapped the whole length of the field, whereas if the machine is only 30 feet wide the overlapped strip is only 20 feet wide.

Sectional shutoff control for portions of implement that apply agricultural products such as seed, fertilizer, and chemicals has therefore become more desirable. These controls allow for application of agricultural products do be stopped at selected portions of the implement. For example a 60 foot wide air seeder might have four sections that can be turned off selectively, allowing the air seeder to apply seed and fertilizer over 60 feet, 45 feet, 30 feet, or 15 feet. Thus it can be seen that overlap can be greatly reduced.

Sectional shutoff control has been common for some time on agricultural field sprayers. On this equipment when the sprayer passes over an area that has already been sprayed, the overlapping portion of the sprayer can be turned off by the operator.

With the advent of external guidance systems using the Global Positioning System (GPS) or in some cases towers broadcasting location signals, such sectional shutoff control can be accomplished automatically.

Such external guidance systems have been developed to guide an implement along a desired path. Typically in agricultural field operations the implement will be towed by a tractor or like vehicle and the object is to cover the entire field by passing back and forth over the field with the edge of the implement located just at the edge of the last pass such that no part of the field is missed, and yet overlap is kept to a minimum. The implement may also be mounted directly on the vehicle instead of being towed, so as to be moved along the field with the vehicle. For example in self-propelled sprayers the implement comprises spray booms extending laterally from a vehicle carrying a spray tank, pump, and like operational equipment for the implement. Similarly, tillage and seeding implements can be mounted on a tractor by a three point hitch arrangement, as well as being towed by the tractor.

External guidance systems include receivers mounted on the vehicle to receive location information from global positioning satellites or from radio transmitter towers. The system is programmed to track the location of the vehicle over time, and using this location data, a microprocessor provides a steering guide for the vehicle.

The width of the implement being used is entered into the microprocessor and the external guidance system continuously determines the location of the vehicle and the microprocessor tracks and stores the path the vehicle takes as it passes across the field. The microprocessor can thus determine a desired second path adjacent to a first pass by moving the second path over one implement width from the first pass. As the vehicle moves along the field to create the second path, the microprocessor indicates to the vehicle operator the actual location of the vehicle compared to the desired location that is on the second path. In one common system, a light bar is used. A green light in the center of the bar indicates that the vehicle is at the correct location, while yellow lights to each side indicate a variance to the left or right, and the operator steers the vehicle accordingly. Other indicators are also known.

Automatic steering systems have now been developed whereby the microprocessor is used to actually steer the vehicle as opposed to simply indicating to the operator which direction he should steer. Typically the vehicle will be steered by a steering actuator, commonly a hydraulic steering cylinder, that is extended and retracted to steer the vehicle in response to signals from the steering wheel of the vehicle. In an auto-steering system, the microprocessor sends steering signals to the steering actuator. Using the above example of the light bar indicator, when the light is green, the microprocessor steering signal would maintain the actuator in its current position. When a yellow light indicates a variance from the desired location that is on the desired path, the microprocessor steering signal extends or retracts the steering actuator to steer the vehicle toward the desired path. When the guidance system senses that the vehicle is at a location that is on the desired path, the microprocessor steering signal would again maintain the actuator in its current position.

When using an external guidance system, an operator will commonly make about two passes around the field with the implement to establish the field boundaries in the microprocessor, and to provide a turning area, and then make passes back and forth across the field starting at one straight edge of the field and working across the field until the field is completed. Some areas of overlap are unavoidable such as when the implement meets the end of the field at an angle other than perpendicular, but these areas are relatively small and of no great concern.

The main concern with overlap is when a strip of field possibly a mile long remains to be seeded that is substantially narrower than the implement being used. For example the strip may be 10-15 feet across and the implement 60 feet wide, leading to a significant area of overlap.

Product sectional shutoff controls that are controlled by external guidance systems such as GPS are available for seeding implements. This technology has evolved from spraying equipment where sections of a spray boom are turned off to avoid overlap, and similarly with seeding implement when the seeder reaches the last narrow pass, the external guidance system gauges where the field has been seeded and where the unseeded strip is located in relation to the implement and automatically turns on seed and fertilizer distribution to the implement sections that are required to cover the unseeded strip, and turns off seed and fertilizer distribution to the sections that are overlapping the already seeded portions of the field.

Unlike sprayers however, seeding implements include furrow openers that engage the ground. The furrow openers that travel over the already seeded areas thus disrupt the seed and fertilizer that has been placed at carefully selected locations with respect to each other, and at a desired depth, and that has typically been packed to ensure good seed to soil contact and promote quick germination. Thus where the 60 foot wide implement is seeding a 10 foot wide strip while deposition of seed and fertilizer is halted on the overlap areas, the furrow openers disrupt the seed and fertilizer in a strip 50 feet wide the length of the field, reducing optimum conditions for seed germination and productivity.

To address this problem, work is being done to develop implements where the product sectional control signals that control distribution of agricultural product to the separate sections of the implement also lift the furrow openers in those sections where distribution is stopped. Thus the furrow openers that are traveling over already seeded areas are raised above the ground and do not disrupt the seed and fertilizer already placed and packed. Such developments introduce considerable added expense and complexity to the seeding implement, and contribute to added maintenance and downtime due to equipment failure. Further, lifting a large number of openers on one side of a drill causes uneven draft from right to left and causes the implement to skew.

SUMMARY OF THE INVENTION

It is an object of the present invention to provide a seeding method for avoiding overlap that overcomes problems in the prior art.

In a first embodiment the present invention provides a method for applying agricultural products on a field with an implement guided by an external guidance system, wherein the implement comprises a plurality of sections across a width thereof, and wherein each section can be turned on to apply the products or turned off to stop applying the products. The method comprises mapping the field to determine an implement travel path comprising a plurality of passes along the field as required to complete a product application operation on the field; determining overlap areas in the field where a section of the implement on a later pass will travel over a portion of an earlier pass of the implement; moving the implement along the implement travel path with sections turned on as required to apply the products on the field outside the overlap areas; and for at least one overlap area, during the earlier pass turning sections of the implement that are completely in the overlap area off, and during the later pass turning sections of the implement that are in the overlap area on.

In a second embodiment the present invention provides a method for seeding a field with a seeding implement guided by an external guidance system, wherein the seeding implement comprises a plurality of sections across a width thereof, and wherein each section can be turned on to deliver seed through furrow openers in the section or turned off to stop delivering seed therethrough. The method comprises mapping the field to determine an implement travel path comprising a plurality of passes along the field as required to complete a seeding operation on the field with the seeding implement moving along the passes of the implement travel path from earlier passes to later passes; determining overlap areas in the field where a section of the implement moving on a later pass will travel over a portion of an earlier pass of the implement; moving the seeding implement along the implement travel path with sections turned on as required to seed the field outside the overlap areas; and for at least one overlap area, during the earlier pass through the at least one overlap area turning sections of the implement that are completely in the at least one overlap area off, and during the later pass turning sections of the implement that are at least partially in the overlap area on.

Recently available mapping programs with new controlling functions and displays for the GPS mapping and controlling system will turn off the product on the first pass of areas where overlap will become unavoidable and following with full passes on the final passes thus planted crops are not disturbed once planted. The mapping system plans ahead where overlapping will occur later and the control system automatically shuts product of in the areas where overlap will occur. As a result doubling up of product application is avoided and ripping up of planted crop is avoided.

In prior art programming technology the product was shut off the second time an implement portion overlapped a previous pass. This technology evolved from sprayer and other top applied agricultural activities where it is natural to shut product off when encountering an area that has already been treated, and where no ground engaging tools were present to cause product disruption during the second pass. To avoid this disruption the prior art has been developing complex and costly equipment for sectional lifting of ground engaging tools, which is not only costly and complex, but leads to implement skewing when lifting openers on one side of the implement and not the other.

In this improved method the product is shut off when a portion of the implement encounters the overlap area on the first pass over the shaded area, thus avoiding the problems of product disruption economically and effectively.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
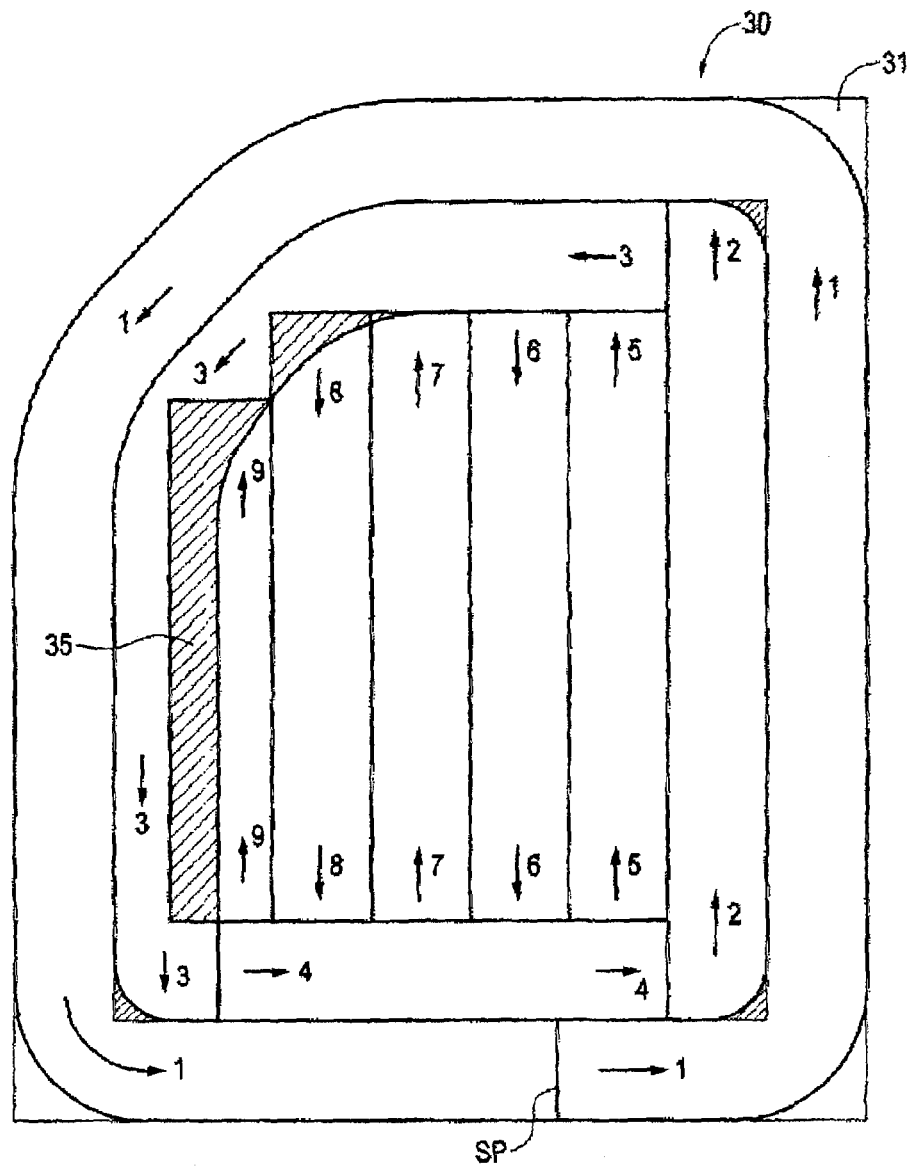
FIG. 1 is schematic top view showing a field mapped according an embodiment of the method of the present invention.

FIG. 1 schematically illustrates a top view of an implement travel path comprising a plurality of passes labeled 1-9 along a field 30 as required to complete a product application operation on the field using an embodiment of the method of the present invention.

Figure 2:
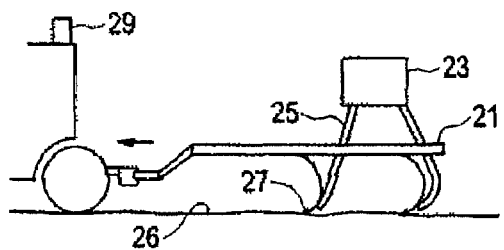
FIG. 2 is a schematic side view of a prior art seeding implement that can be used with the method shown in FIG. 1.
Figure 3:
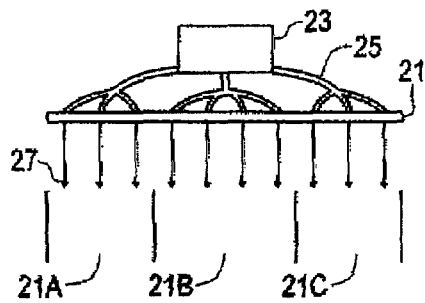
FIG. 3 is a schematic front view of the seeding implement of FIG. 2.

FIGS. 2 and 3 schematically illustrate a seeding implement 21 for use with the present method, although it is also contemplated that other implements may be used as well. The implement 21 comprises a plurality of sections 21A, 21B, 21C across a width thereof. A tank 23 carries agricultural products to be applied on the field 23. The products are transferred through a distribution network 25 to furrow openers 27 and into furrows made by the furrow openers 27 when they are engaged in the ground, thus applying the agricultural products to the field. The furrow openers 27 movable from a lowered operating position, where the furrow openers engage the ground 26 as illustrated in FIG. 2, to a raised transport position where the furrow openers 27 are above the ground 26.

The implement 21, tank 23, and distribution network 25 are schematically illustrated only, and a typical seeding implement may have a plurality of tanks each carrying a different product such as seed, fertilizer, various chemicals, or the like distributed either mixed or separately to the furrow openers as is well known in the agricultural industry. In the seeding implement 21 for use with the method of the present invention the distribution network 25 is configured such that each section 21A, 21B, 21C can individually be turned on to deliver product through furrow openers 27 in the section or turned off to stop delivering product therethrough.

The implement 21 is guided by an external guidance system 29 such as is known in the art that is typically mounted on the towing tractor and which receives location signals from global positioning satellites, radio towers, or the like. Using the external guidance system 29 and the microprocessor incorporated therein the field 30 is mapped. Typically such mapping is accomplished by making a first pass 1 with the implement 21 around the outside boundary of the field 30, starting and finishing at the starting point SP. Often a second implement width will be made around the field with passes 2, 3, and 4 to provide a turning area at each end of the field. The map for a particular field can be stored and retrieved for subsequent field operations. The map is generated and stored in the external guidance system, and may be displayed to the operator.

The field 30 is a fairly typical shape with slightly rounded corners. Although land is commonly divided and surveyed with square corners, the rounded outer corners commonly develop in field operations because of the need to turn the implement at the corners. Thus small areas of land 31 at the outer corners of the field are commonly uncultivated because there is no practical way to conduct field operations thereon. Thus the first pass 1 all the way around the illustrated field 30 is made with the furrow openers 27 down in the operating position and the distribution network 25 operating to seed the field beginning at the staring point SP, and when the implement 21 again reaches the starting point SP after completing the first pass 1 the furrow openers are raised and distribution of seed is turned off.

With this outer boundary mapped, the microprocessor can map the field to determine an implement travel path that comprises a plurality of further passes 2-9 along the field as required to complete a product application or seeding operation on the field 30. It can be seen in FIG. 1 that the resulting mapped travel path will result in overlap areas, marked by cross-hatching, in the field where a section of the implement 21 on a later pass will pass over a portion of an earlier pass of the implement 21. For example when the implement 21 moves straight through at the end of a pass, such as at each end of pass 2, there is a small area of overlap between the first and second passes because of the rounded corner of the previous pass 1.

Similarly see the curved portion of pass 3 where overlap occurs at the end of pass 8. These are relatively small areas in the illustrated field 30 and not usually of great concern, but the long field strip 35 where in the final pass 9 the implement 21 travels over a strip of field which was travelled over by the implement 21 on the previous pass 3 is of significant size.

In the method of the present invention the implement 21 is moved along the passes of the implement travel path with all sections turned on as required to apply the products on the field 30 outside the overlap areas. The second implement width is accomplished after the implement reaches the end of pass 1 at the starting point SP by maneuvering the raised implement to the beginning of pass 2, then lowering the furrow openers and distributing product through each section while moving to the end of pass 2, again raising and stopping distribution until maneuvered to the start of pass 3.

Figure 4:
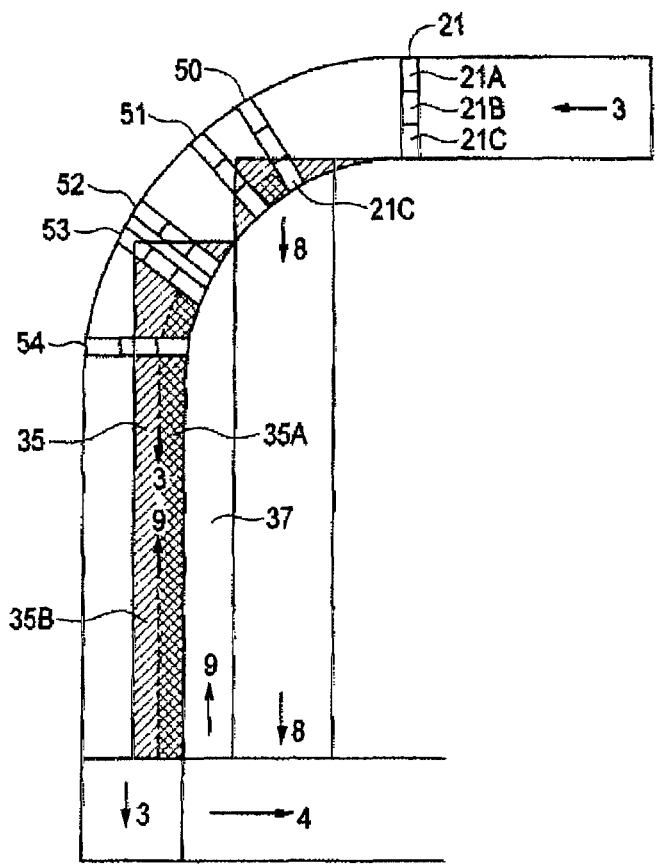
FIG. 4 is a schematic top view showing various positions of the seeding implement of FIG. 2 as it travels along pass 3 in FIG. 3.

In pass 3 the overlap areas are encountered. Beginning pass 3 all sections 21A, 21B, 21C are turned on until the implement reaches position 50, as illustrated in FIG. 4, where section 21C is completely inside the overlap area, at which time distribution to section 21C is turned off until the implement reaches position 51 where a portion of section 21C is about to move outside the overlap area. All sections are then turned on until the implement reaches position 52 where section 21C is again completely inside the overlap area, at which time distribution to section 21C is again turned off.

When the implement 21 reaches position 53 it can be seen that the middle section 21B is completely inside the overlap area, but only very briefly, and in practice the microprocessor of the external guidance system 29 will likely be programmed to ignore such very brief periods of possible complete overlap of sections, since turning on and off the distribution of agricultural products is not instantaneous. Thus in practice the middle section 21B will likely remain turned on through position 53. Similarly it may be that the section 21C remains turned on during the short distance between position 50 and position 51 instead of being turned on.

As the implement 21 moves on to position 54, the outer end of the middle section 21B moves out of the overlap area and remains out of the overlap area down the entire length of the field strip 35 while the section 21C remains turned off down the entire length of the field strip 35.

While distribution of agricultural products to the furrow openers 27 of the sections is turned on and off as described above, at all times the furrow openers remain in their lowered operating position engaged in the ground, but are not always depositing any product in the furrows they make.

At the end of pass 3 the furrow openers are raised and the product distribution stopped, and the implement is maneuvered to the beginning of pass 4 where the furrow openers are lowered and distribution resumed to all sections to seed pass 4 and complete the second implement width around the field 30.

The implement 21 is then maneuvered to the start of pass 5 and proceeds to seed implement passes 5-8 with product distribution to all sections turned on. When pass 8 is completed a field strip 37 requiring product application remains between the edges of pass 3 and pass 8 that is narrower than the width of the implement 21, and in order to seed this strip 37, pass 9 is required.

Thus during pass 9 the major overlap area of strip 35 is again encountered. Since the distribution of product was turned off to section 21C in the earlier pass 3 through the overlap area strip 35, agricultural product was not applied to the double cross hatched portion 35A of the strip 35 during the earlier pass 3. During this later pass 9 product distribution to all sections is turned on and the overlap area 35A is seeded during the second pass over it instead of during the first pass over it as in the prior art.

Agricultural products are applied on the single cross hatched portion 35B of the strip 35 during pass 3 since the middle section 21B was not entirely inside the overlap area of strip 35 and it was necessary to turn on product distribution in order to cover the portion of field in pass 3 that is adjacent to the overlap area. Product is again applied on the single cross hatched portion 35B of the strip 35 during pass 9, such that portion 35B is double applied.

The method of the present invention does however reduce the double seeded portion from the area of strip 35 to the reduced area of strip portion 35B. Further reductions can be realized by providing an increased number of independently controlled sections on the implement 21. The distribution network 25 could be configured so that product flow to each individual furrow opener 27 could be controlled, such that each "section" comprised a single furrow opener 27.

For an operation such as seeding, the method of the invention thus seeds the overlap area during the second pass thereover, rather than the first, such that seed packing and seed placement is not disrupted.

The implement can be guided by the operator following signals from the external guidance system 29, or by an automatic steering system used in conjunction with the external guidance system. In the example described above the passes are travelled in order from the first pass 1 through adjacent passes to a final pass 9, however it is contemplated that the passes could be made in any order, so long as product delivery is turned off during the initial pass through the overlap areas.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method for applying agricultural products on a field with an implement guided by an external guidance system, wherein the implement comprises a plurality of sections across a width thereof, and wherein each section can be turned on to apply the products or turned off to stop applying the products, the method comprising:
   mapping the field to determine an implement travel path comprising a plurality of passes along the field as required to complete a product application operation on the field;
   determining overlap areas in the field where a section of the implement on a later pass will travel over a portion of an earlier pass of the implement;
   moving the implement along the implement travel path with sections turned on as required to apply the products on the field outside the overlap areas; and
   for at least one overlap area, during the earlier pass turning sections of the implement that are completely in the overlap area off, and during the later pass turning sections of the implement that are in the overlap area on.

2. The method of claim 1 wherein the implement applies the agricultural products through a plurality of furrow openers movable from a lowered operating position, where the furrow openers engage the ground, to a raised transport position where the furrow openers are above the ground, and wherein the furrow openers are maintained in the lowered operating position during the earlier and later passes.

3. The method of claim 1 wherein the passes are travelled in order from a first pass through adjacent passes to a final pass.

4. The method of claim 1 wherein the travel path includes a plurality of substantially parallel passes, and wherein a field strip requiring product application remains between two previous passes, and wherein the strip is narrower than a width of the implement.

5. The method of claim 4 wherein the at least one overlap area is adjacent to the field strip.

6. The method of claim 1 wherein each section comprises a single furrow opener.

7. A method for seeding a field with a seeding implement guided by an external guidance system, wherein the seeding implement comprises a plurality of sections across a width thereof, and wherein each section can be turned on to deliver seed through furrow openers in the section or turned off to stop delivering seed therethrough, the method comprising:
   mapping the field to determine an implement travel path comprising a plurality of passes along the field as required to complete a seeding operation on the field with the seeding implement moving along the passes of the implement travel path from earlier passes to later passes;
   determining overlap areas in the field where a section of the implement moving on a later pass will travel over a portion of an earlier pass of the implement;
   moving the seeding implement along the implement travel path with sections turned on as required to seed the field outside the overlap areas; and
   for at least one overlap area, during the earlier pass through the at least one overlap area turning sections of the implement that are completely in the at least one overlap area off, and during the later pass turning sections of the implement that are at least partially in the overlap area on.

8. The method of claim 7 wherein the furrow openers are movable from a lowered operating position, where the furrow openers engage the ground, to a raised transport position where the furrow openers are above the ground, and wherein the furrow openers are maintained in the lowered operating position during the first and second passes.

9. The method of claim 7 wherein the passes are travelled in order from a first pass to a final pass.

10. The method of claim 7 wherein the travel path includes a plurality of substantially parallel passes, and wherein a field strip requiring seeding remains between two previous passes, and wherein the strip is narrower than a width of the implement.

11. The method of claim 10 wherein the at least one overlap area is adjacent to the field strip.

12. The method of claim 7 wherein each section comprises a single furrow opener.

* * * * *